(12) United States Patent
Hirose et al.

(10) Patent No.: US 11,853,079 B2
(45) Date of Patent: Dec. 26, 2023

(54) SELF-POSITION ESTIMATION APPARATUS AND MOBILE OBJECT

(71) Applicant: Panasonic Corporation, Osaka (JP)

(72) Inventors: Motoki Hirose, Osaka (JP); Akio Shigekane, Osaka (JP)

(73) Assignee: PANASONIC HOLDINGS CORPORATION, Osaka (JP)

( * ) Notice: Subject to any disclaimer, the term of this patent is extended or adjusted under 35 U.S.C. 154(b) by 118 days.

(21) Appl. No.: 17/453,505

(22) Filed: Nov. 4, 2021

(65) Prior Publication Data

US 2022/0137627 A1 May 5, 2022

(30) Foreign Application Priority Data

Nov. 5, 2020 (JP) .................................. 2020-185043

(51) Int. Cl.
*G05D 1/02* (2020.01)
*G05D 1/00* (2006.01)

(52) U.S. Cl.
CPC ........... *G05D 1/028* (2013.01); *G05D 1/0088* (2013.01); *G05D 1/0238* (2013.01)

(58) Field of Classification Search
CPC .... G05D 1/028; G05D 1/0088; G05D 1/0238; G05D 1/0227; G05D 1/027;
(Continued)

(56) References Cited

U.S. PATENT DOCUMENTS

2019/0018131 A1* 1/2019 Luders .................... G01S 17/87
2019/0378423 A1 12/2019 Bachrach et al.
2022/0137628 A1* 5/2022 Biel ....................... G05D 1/0268
701/25

FOREIGN PATENT DOCUMENTS

CN 106405605 A * 2/2017 ........... G01C 21/206
DE 102019203202 A1 9/2020
(Continued)

OTHER PUBLICATIONS

Gusenbauer et al.; Self-Contained Indoor Positioning on Off-The-Shelf Mobile Devices; 2010 International Conference on Indoor Positioning and Indoor Navigation (IPIN), Sep. 15-17, 2010, Zürich, Switzerland (Year: 2010).*
(Continued)

*Primary Examiner* — Michael J Zanelli
(74) *Attorney, Agent, or Firm* — PEARNE & GORDON LLP

(57) ABSTRACT

Provided is a self-position estimation apparatus capable of appropriately estimating a self-position of a mobile object regardless of an environment around the mobile object. The self-position estimation apparatus is for estimating a self-position of a mobile object, and includes: N types of sensors (where N is a natural number equal to or greater than two) that detect information with different contents from each other regarding a moving status of the mobile object; an environment determiner that determines an environment around the mobile object; a selector that selects information detected by one or more but less than the N types of sensors based on a determination result of the environment determiner; and an estimator that estimates the self-position of the mobile object based on the information selected by the selector.

15 Claims, 9 Drawing Sheets

(58) Field of Classification Search
CPC .... G05D 1/0278; G05D 1/024; G05D 1/0231; G05D 1/0246; G05D 2201/02
See application file for complete search history.

(56) References Cited

FOREIGN PATENT DOCUMENTS

| JP | 2007-200049 A | 8/2007 | | |
|---|---|---|---|---|
| JP | 2008-083777 A | 4/2008 | | |
| JP | 2017-049694 A | 3/2017 | | |
| JP | 2020-008461 A | 1/2020 | | |
| JP | 2020-095339 A | 6/2020 | | |
| TW | 1725611 B | * | 4/2021 | ............ G01S 17/86 |
| WO | 2020/121900 A1 | 6/2020 | | |

OTHER PUBLICATIONS

Collier et al.; Environment Classification for Indoor/Outdoor Robotic Mapping; 2009 Canadian Conference on Computer and Robot Vision (Year: 2009).*

Zhan et al.; Lobot: Low-Cost, Self-Contained Localization of Small-Sized Ground Robotic Vehicles; IEEE Transactions on Parallel and Distributed Systems, vol. 24, No. 4, Apr. 2013; pp. 744-753 (Year: 2013).*

Extended European search report issued in European Patent Application No. 21206364.8 dated Mar. 29, 2022.

* cited by examiner

SELF-POSITION ESTIMATION APPARATUS AND MOBILE OBJECT

CROSS REFERENCE TO RELATED APPLICATIONS

This application is entitled to (or claims) the benefit of Japanese Patent Application No. 2020-185043, filed on Nov. 5, 2020, the disclosure of which including the specification, drawings and abstract is incorporated herein by reference in its entirety.

TECHNICAL FIELD

The present disclosure relates to a self-position estimation apparatus and a mobile object.

BACKGROUND ART

Conventionally, mobile objects have been known which autonomously move, using a sensor and a map that are mounted thereon (e.g., see Patent Literature (hereinafter referred to as "PTL") 1).

The mobile object described in PTL 1 includes an angular velocity calculation section, a gyro, and a movement control section. The angular velocity calculation section calculates an angular velocity of the mobile object based on the amount of rotation of a rotation motor that rotates and drives driving wheels of the mobile object. The gyro directly obtains the angular velocity of the mobile object. The movement control section estimates a rotation angle by using the angular velocity obtained by the gyro when a difference between the angular velocity calculated by the angular velocity calculation section and the angular velocity obtained by the gyro is greater than a predetermined value. On the other hand, when the difference is smaller than the predetermined value, the movement control section estimates a rotation angle by using the angular velocity calculated by the angular velocity calculation section.

CITATION LIST

Patent Literature

PTL 1
Japanese Patent Application Laid-Open No. 2007-200049

SUMMARY OF INVENTION

Technical Problem

An object of the disclosure is to provide a self-position estimation apparatus and a mobile object each capable of appropriately estimating a self-position of the mobile object regardless of an environment around the mobile object.

Solution to Problem

A self-position estimation apparatus is for estimating a self-position of a mobile object, the self-position estimation apparatus including: N types of sensors (where N is a natural number equal to or greater than two) that detect information with different contents from each other regarding a moving status of the mobile object; an environment determiner that determines an environment around the mobile object; a selector that selects information detected by one or more but less than the N types of sensors based on a determination result of the environment determiner; and an estimator that estimates the self-position of the mobile object based on the information selected by the selector.

A mobile object of the present disclosure includes the self-position estimation apparatus described above.

Advantageous Effects of Invention

According to a self-position estimation apparatus and a mobile object of the present disclosure, it is possible to appropriately estimate a self-position of the mobile object regardless of an environment around the mobile object.

DESCRIPTION OF EMBODIMENTS

Embodiment

Hereinafter, an embodiment of the present disclosure will be described in detail with reference to the accompanying drawings.

<Mobile Object Configuration>

Figure 1:
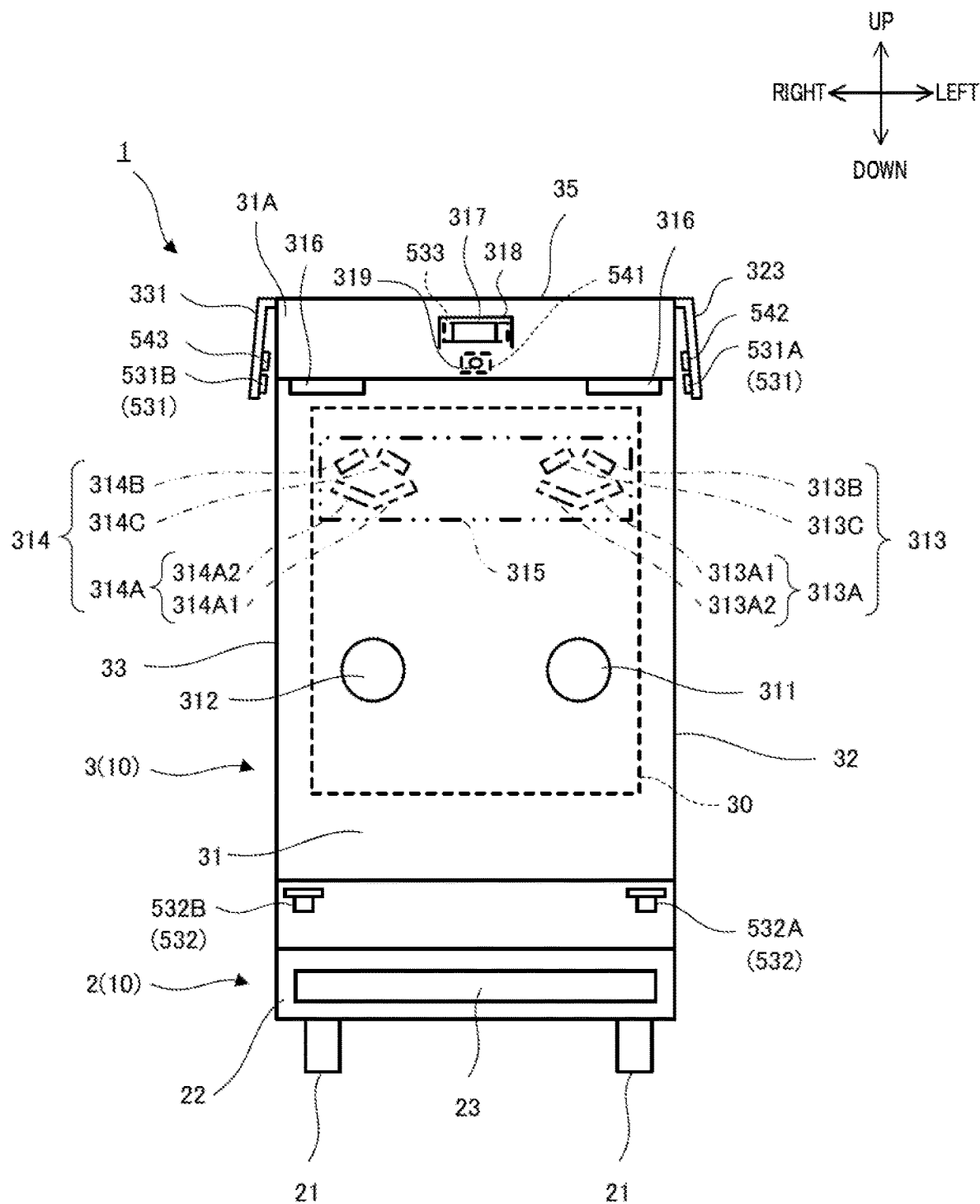
FIG. 1 is a front view of a mobile object according an embodiment of the present disclosure.
Figure 2:
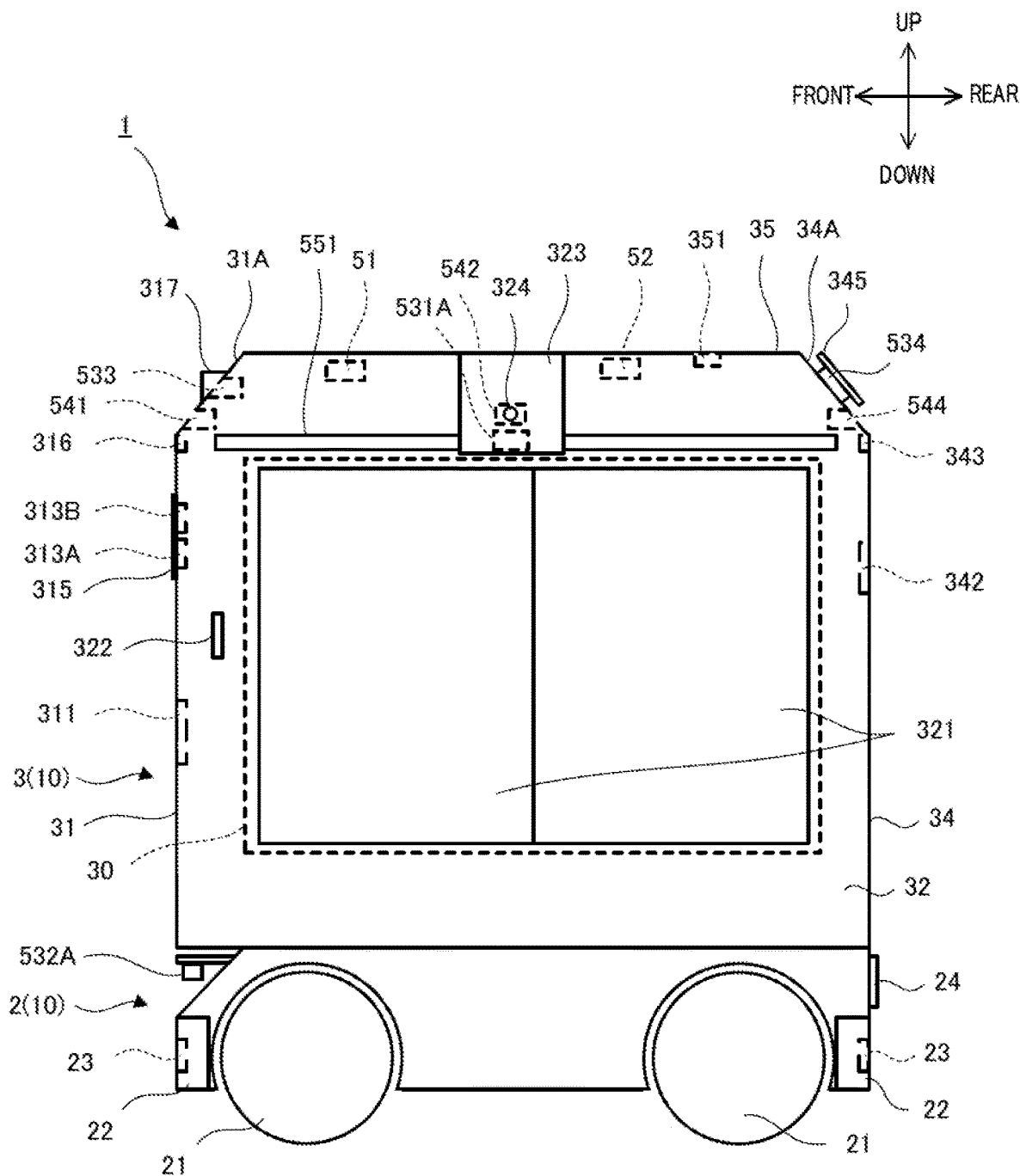
FIG. 2 is a left side view of the mobile object according the embodiment of the present disclosure.
Figure 3:
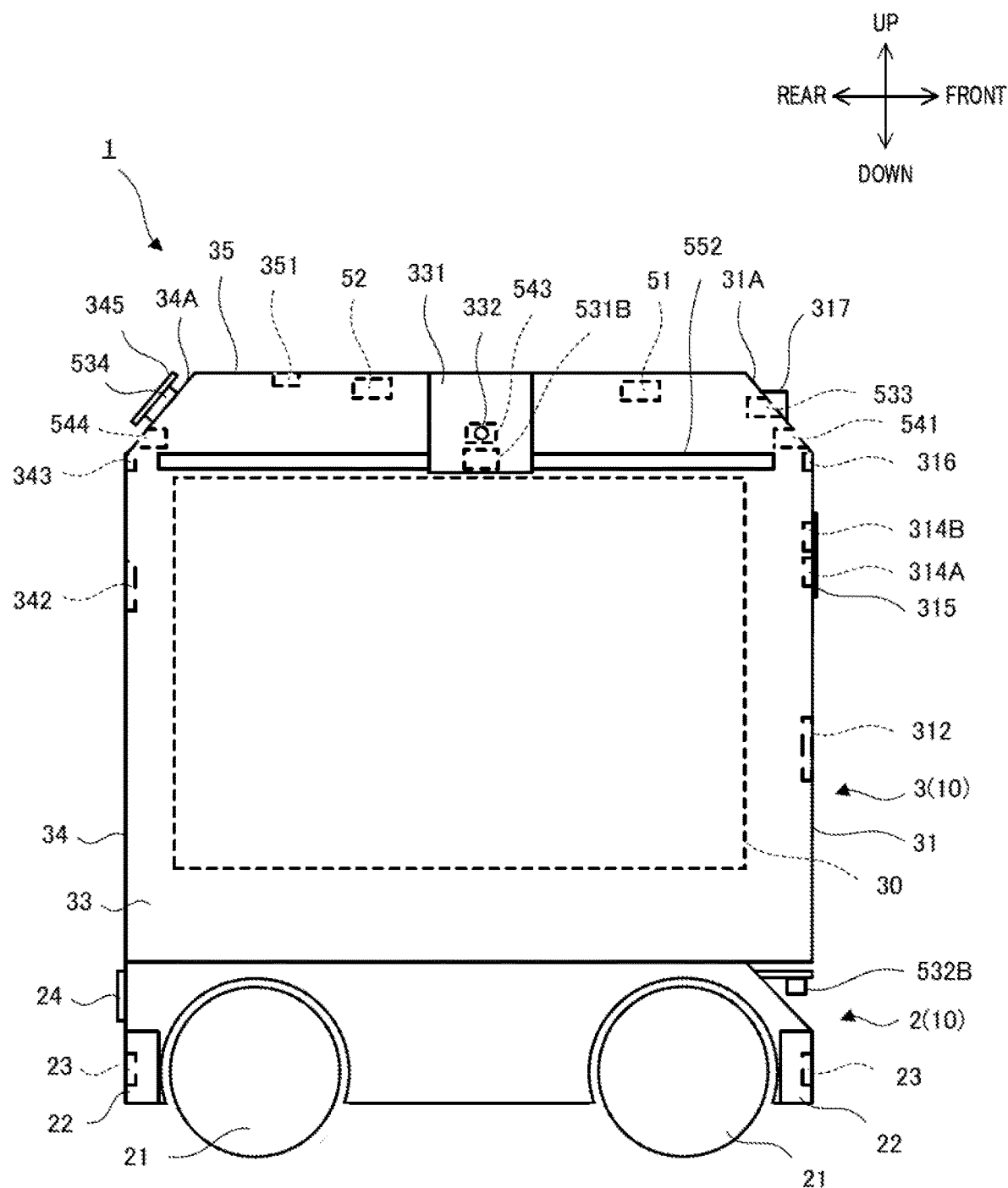
FIG. 3 is a right side view of the mobile object according the embodiment of the present disclosure.
Figure 4:
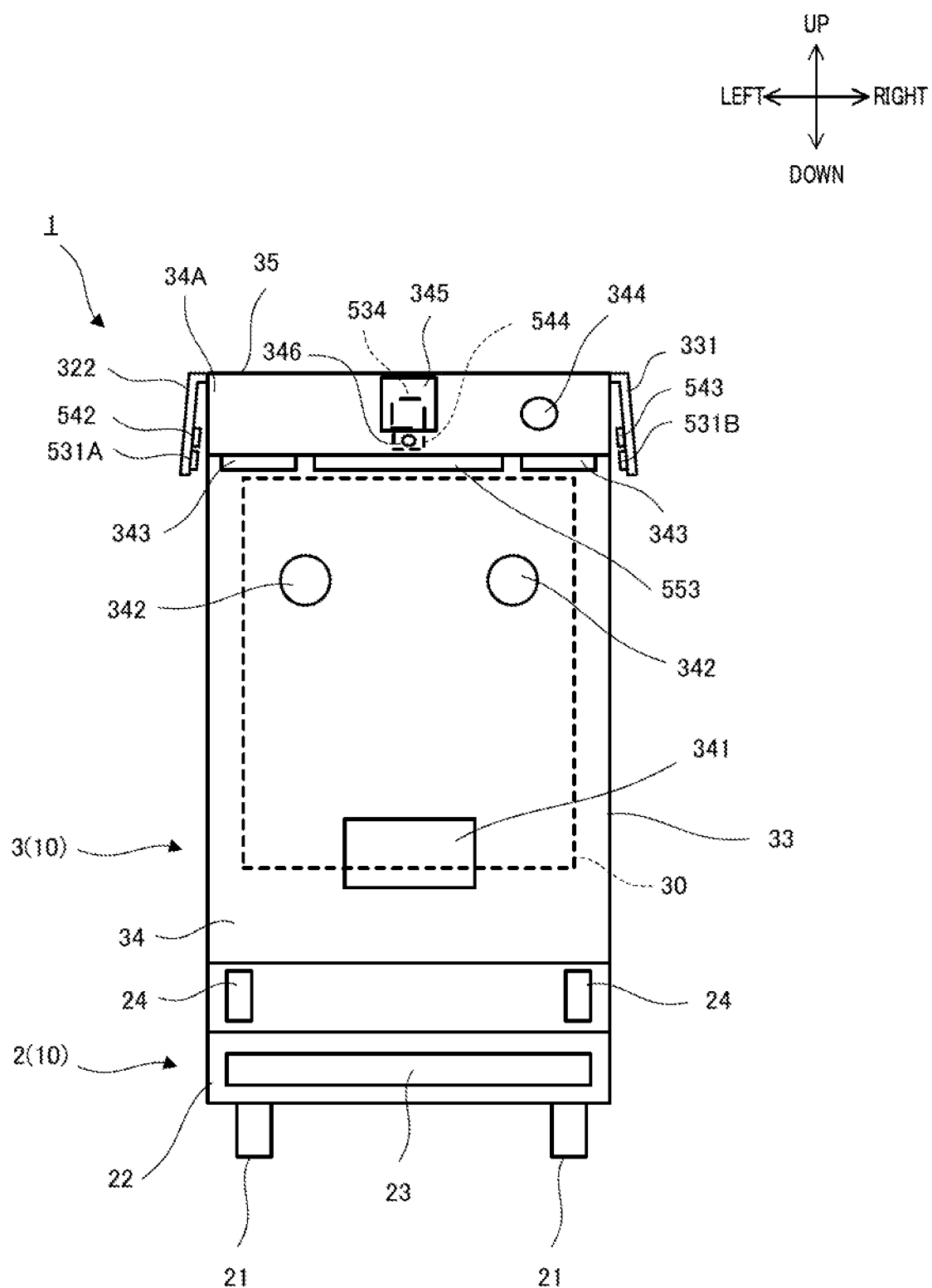
FIG. 4 is a back view of the mobile object according the embodiment of the present disclosure.
Figure 5:
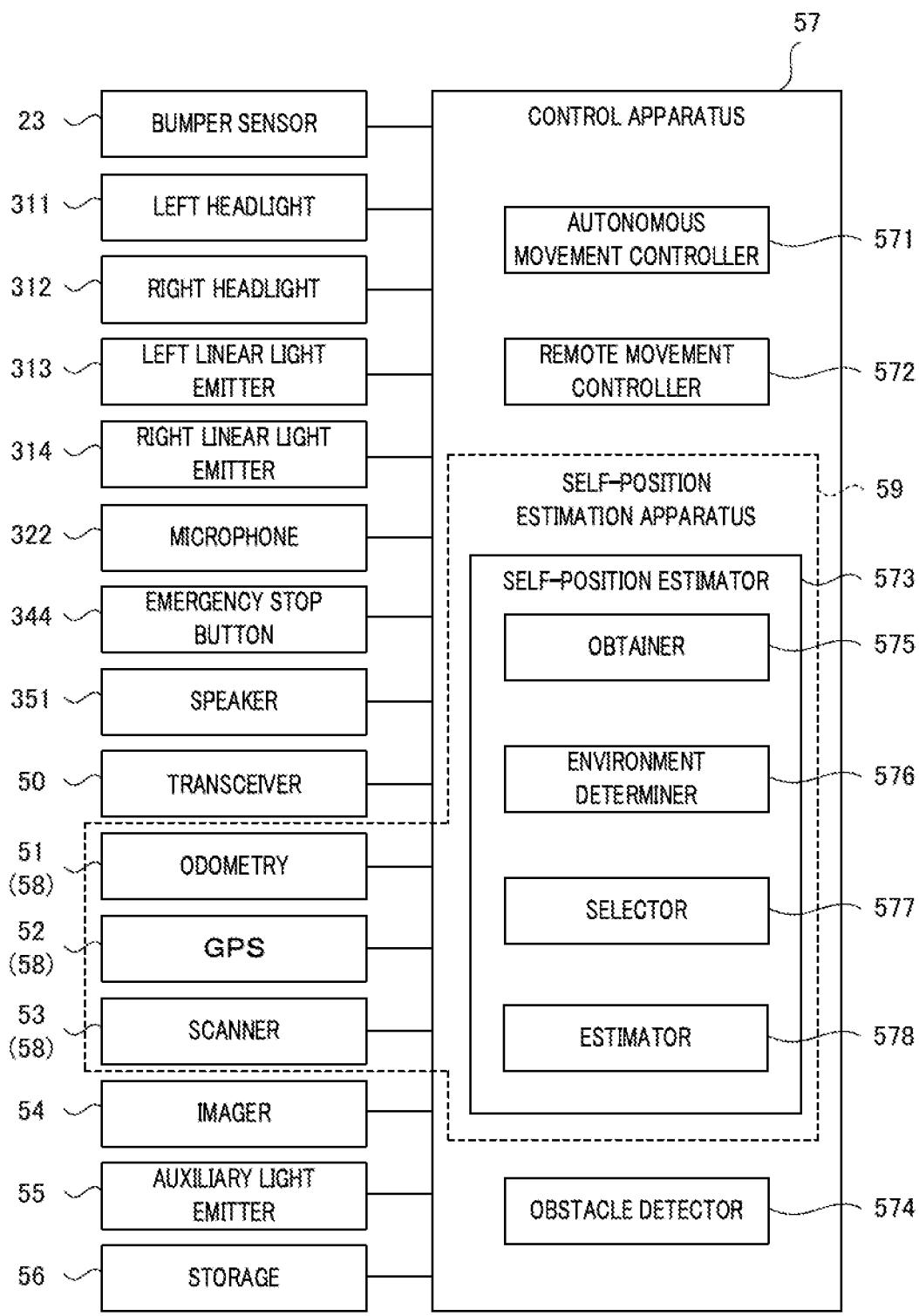
FIG. 5 is a block diagram illustrating a control system of the mobile object according the embodiment of the present disclosure.
Figure 6:
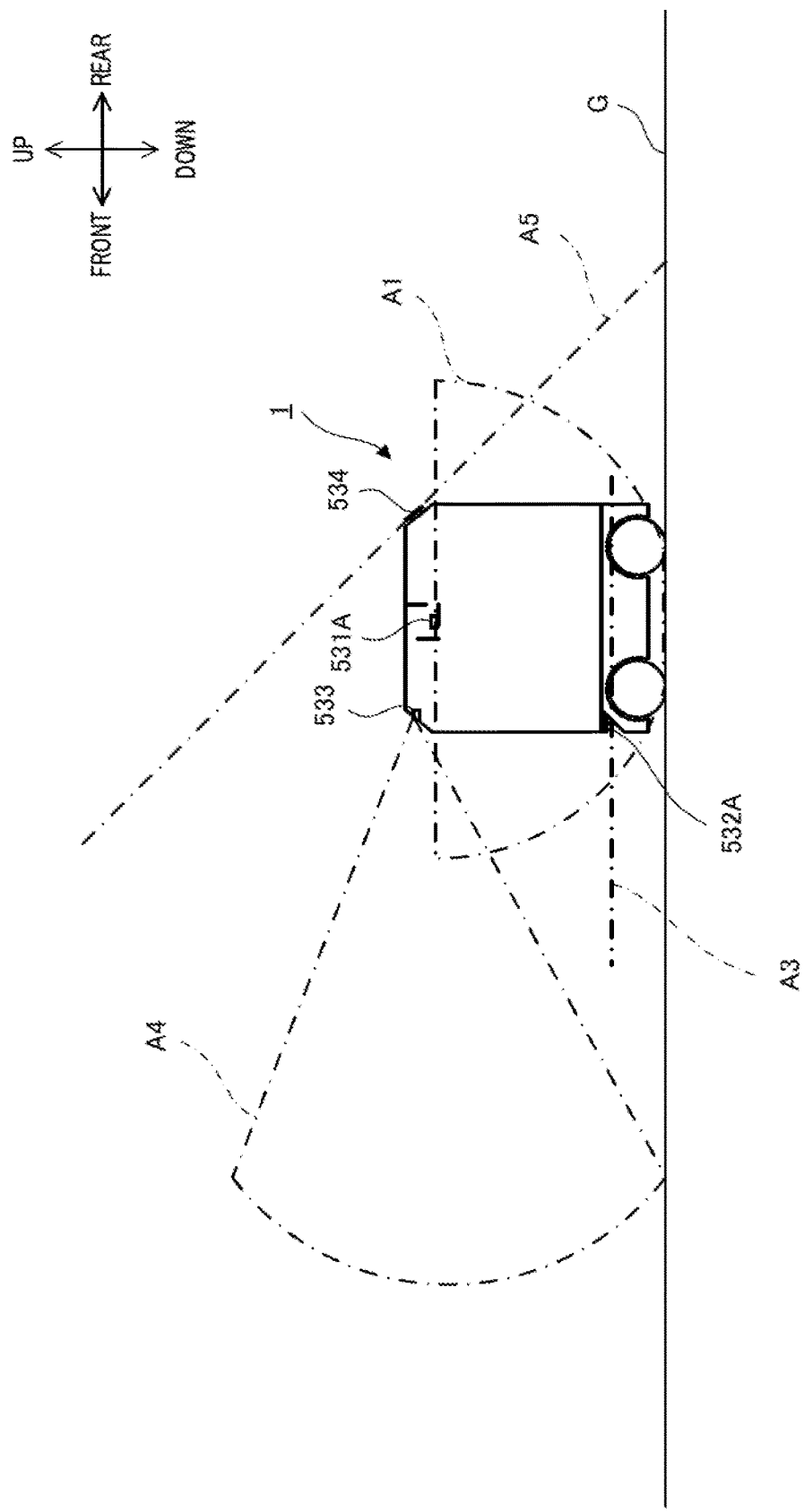
FIG. 6 is a left side view of a scan range of the mobile object according the embodiment of the present disclosure.
Figure 7:
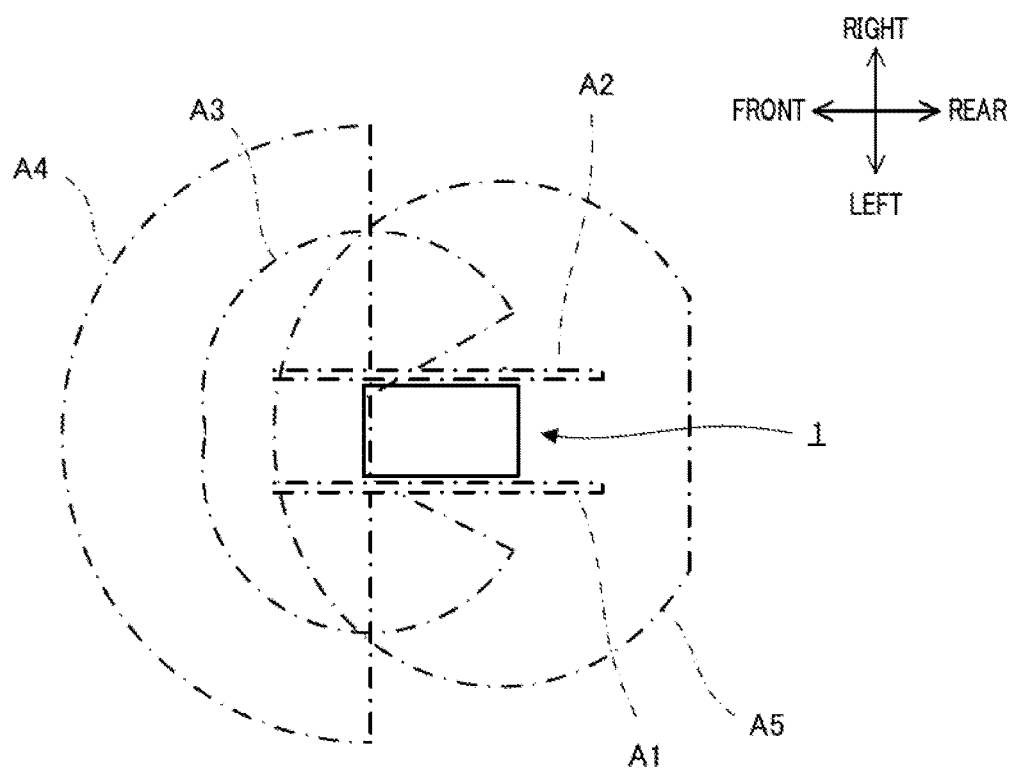
FIG. 7 is a plan view of the scan range of the mobile object according the embodiment of the present disclosure.
Figure 8:
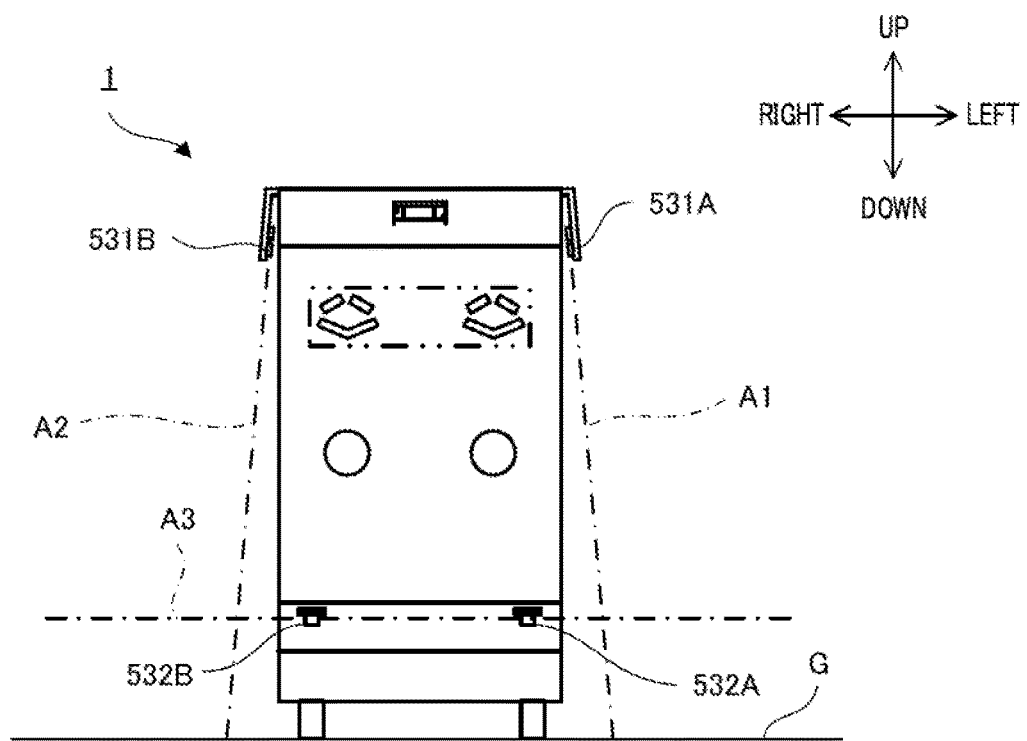
FIG. 8 is a front view of the scan range of the mobile object according the embodiment of the present disclosure.

A configuration of a mobile object will be described. In the present embodiment, as an example of the mobile object, a description will be given of a transport robot for transporting an article outdoors, indoors, in a facility, private land, or the like, but the mobile object may be, for example, a vacuum cleaner, a mobile object for various kinds of sensing, a communication robot for communicating with a person, an automobile or train for transporting a person outdoors, indoors, in a facility, private land, or the like, and a cart which is moved by a person pushing. FIG. 1 is a front view of the mobile object. FIG. 2 is a left side view of the mobile object. FIG. 3 is a right side view of the mobile object. FIG. 4 is a back view of the mobile object. FIG. 5 is a block diagram illustrating a control system of the mobile object. FIG. 6 is a left side view of a scan range of the mobile object. FIG. 7 is a plan view of the scan range of the mobile object. FIG. 8 is a front view of the scan range of the mobile object.

First, a configuration of mobile object 1 will be described. Note that, as illustrated in FIGS. 1 to 4, the directions of front-rear, up-down, and left-right are defined with reference to mobile object 1 as viewed from a rear side. Mobile object 1 includes base body 2 and main body 3. Base body 2 and main body 3 form vehicle body 10.

Base body 2 includes four wheels 21. Wheels 21 rotate independently from each other with driving of a drive motor (not illustrated) installed inside base body 2. At front and rear portions of base body 2, bumpers 22 are arranged, respectively. On front and rear bumpers 22, bumper sensors 23 are arranged, respectively. When an object comes into contact with bumper sensor 23, bumper sensor 23 outputs a detection signal indicating that the object has come into contact with bumper 23.

A pair of left and right reflection boards 24 are arranged above rear bumper 22. A battery (not illustrated) is placed in base body 2.

Main body 3 is formed in a rectangular box shape. An interior space of main body 3 constitutes housing 30 for housing an article. Main body 3 is placed on an upper surface of base body 2.

Front surface 31 of main body 3 is, as illustrated in FIG. 1, formed in a substantially rectangular shape vertically long in front view.

On front surface 31, left headlight 311 and right headlight 312 (hereinafter, may be referred to as "headlights 311 and 312") are arranged. Headlights 311 and 312 are preferably round or elliptical, which are suggestive of eyes, but are not limited to these shapes.

On front surface 31, left linear light emitter 313 and right linear light emitter 314 are arranged. Left and right linear light emitters 313 and 314 (hereinafter, may be referred to as "linear light emitters 313 and 314") each include a light emission area that emits light linearly. Linear light emitters 313 and 314 are preferably placed almost directly above headlights 311 and 312, respectively, so as to be suggestive of eyebrows.

Left linear light emitter 313 includes first left division linear light emitter 313A, second left division linear light emitter 313B, and third left division linear light emitter 313C. Right linear light emitter 314 includes first right division linear light emitter 314A, second right division linear light emitter 314B and third right division linear light emitter 314C which are linearly symmetrical around a center line in the left-right direction of front surface 31 with respect to, respectively, first left division linear light emitter 313A, second left division linear light emitter 313B, and third left division linear light emitter 313C.

First left division linear light emitter 313A and first right division linear light emitter 314A each include a substantially V-shaped light emission area in front view. Second left division linear light emitter 313B and third right division linear light emitter 314C each include a light emission area extending linearly and obliquely upper rightward, above first left division linear light emitter 313A and first right division linear light emitter 314A, respectively. Third left division linear light emitter 313C and second right division linear light emitter 314B each includes a light emission area extending linearly and obliquely upper leftward on a right side of second left division linear light emitter 313B and third right division linear light emitter 314C, respectively.

Based on the control of control apparatus 57 to be described later, selectively operating any one of first to third left-division linear light emitters 313A to 313C that configure left linear light emitter 313 and any one of first to third right-division linear light emitters 314A to 314C that configure right linear light emitter 314 to emit light while lighting up headlights 311 and 312 thus allows people around mobile object 1 to recognize as if mobile object 1 changes its facial expression.

On front surface 31, cover member 315 that covers linear light emitters 313 and 314 is arranged. Cover member 315 is colored to the same color as front surface 31 and has a function to make linear light emitters 313 and 314 invisible from outside when linear light emitters 313 and 314 do not emit light.

On front surface 31, a pair of left and right front turn signals 316 are arranged. Left and right front turn signals 316 are respectively provided above linear light emitters 313 and 314. An area above front turn signals 316 in front surface 31 (hereinafter referred to as "front inclined area") 31A is inclined rearward.

As illustrated in FIG. 2, storage door 321 is placed on left surface 32 of main body 3. Opening storage door 321 allows putting in and taking out an article to/from housing 30. Storage door 321 may be either a turning or sliding door. Microphone 322 is placed forward of storage door 321 in left surface 32.

Left protrusion 323 is provided at a central position at the upper end of left surface 32 in a front-rear direction. Left protrusion 323 includes a base extending leftward and a tip extending obliquely downward from a leading end of the base.

As illustrated in FIG. 3, on right surface 33 of main body 3, right protrusion 331 is provided which has the same shape as left protrusion 323.

As illustrated in FIG. 4, number plate 341 is placed on rear surface 34 of main body 3. A pair of left and right brake lamps 342 are arranged above number plate 341. A pair of left and right rear turn signals 343 are arranged on rear surface 34. An area above rear turn signals 343 in rear surface 34 (hereinafter referred to as "rear inclined area") 34A is inclined forward.

Emergency stop button 344 is placed on a right side of rear inclined area 34A. Pressing emergency stop button 344 stops mobile object 1 in emergency.

As illustrated in FIGS. 2 and 3, speaker 351 is placed on a rear side of upper surface 35 of main body 3.

Moreover, as illustrated in FIG. 5, vehicle body 10 includes transceiver 50, odometry 51, Global Positioning System (GPS) 52, scanner 53, imager 54, auxiliary light emitter 55, storage 56, and control apparatus 57.

Odometry 51 detects a movement amount and posture (orientation) of mobile object 1 based on a rotational state of wheels 21 and outputs a detection result.

As illustrated in FIGS. 3 and 4, transceiver 50 and GPS 52 are arranged on an upper side of an inside of main body 3. GPS 52 functions as a radio position information detector that detects GPS information regarding a position of mobile object 1 transmitted via radio.

Scanner 53 scans around mobile object 1 and outputs a scan result. As illustrated in FIGS. 1 to 4, scanner 53 includes first scanner 531, second scanner 532, third scanner 533, and fourth scanner 534.

First scanner 531 scans a moving path of mobile object 1. First scanner 531 includes lower left scanner 531A and lower right scanner 531B. Lower left scanner 531A is placed on a surface that faces left surface 32 at the tip of left protrusion 323. Lower right scanner 531B is placed on a surface that faces right surface 33 at the tip of right protrusion 331. Lower left scanner 531A and lower right scanner 531B are composed of, for example, a two-dimensional Light Detection And Ranging (LiDAR) that scans using scanning light, and outputs a scan result. Lower left scanner 531A scans a two-dimensional scan range that is inclined with respect to a vertical plane on the left of mobile object 1. Lower right scanner 531B scans a two-dimensional scan range that is inclined with respect to a vertical plane on the right of mobile object 1. Specifically, lower left scanner 531A scans a linear two-dimensional scan range (hereinafter referred to as "lower left two-dimensional scan range") A1 having, as illustrated in FIG. 6, a partly-missing (a lower end portion in FIG. 6) semicircular shape in side view, and being inclined, as illustrated in FIGS. 7 and 8, so as to be away from left surface 32 toward downward with respect to the vertical plane. Lower right scanner 531B scans a linear two-dimensional scan range (hereinafter referred to as "lower right two-dimensional scan range") A2 having, similar to a lower left two-dimensional scan range A1, a partly-missing semicircular shape in side view, and being inclined, as illustrated in FIGS. 7 and 8, so as to be away from right surface 33 toward downward with respect to the vertical plane. Incidentally, reference signs G in FIGS. 6 and 8 indicate the ground. Although the shapes of lower left two-dimensional scan range A1 and lower right two-dimensional scan range A2 in side view are not semicircular as described above, in practice, lower left scanner 531A and lower right scanner 531B each scan a semicircular range.

Second scanner 532 scans above the moving path of mobile object 1. Second scanner 532 includes front left scanner 532A and front right scanner 532B. Front left scanner 532A and front right scanner 532B (hereinafter may be referred to as "front scanners 532A and 532B") are arranged at left and right ends on a front surface of base body 2, respectively. Front scanners 532A and 532B are composed of, for example, the two-dimensional LiDAR. Front scanners 532A and 532B scan a two-dimensional scan range parallel to a horizontal plane in front and side of mobile object 1, and outputs a scan result. Specifically, as illustrated in FIGS. 6 to 8, front scanners 532A and 532B scan a two-dimensional scan range (hereinafter referred to as "forward two-dimensional scan range") A3 parallel to the horizontal plane in the front and side of mobile object 1.

Third scanner 533 scans forward of mobile object 1. Third scanner 533 is placed on the inside of main body 3 in front inclined area 31A. At a position that faces third scanner 533 in front inclined area 31A, first opening 317 for exposing third scanner 533 to outside is formed. Front inclined area 31A is provided with eaves part 318 protruding forward from upper and lateral sides of first opening 317. Eaves part 318 prevents third scanner 533 from being wet with rain or snow. Third scanner 533 is composed of, for example, a three-dimensional LiDAR that scans using scanning light. Third scanner 533 scans a three-dimensional scan range which is ahead of mobile object 1, and outputs a scan result. Specifically, third scanner 533 scans a three-dimensional scan range (hereinafter referred to as "forward three-dimensional scan range") A4 having a fan shape in side view as illustrated in FIG. 6 and a semicircular shape in plan view as illustrated in FIG. 7.

Fourth scanner 534 scans rearward of mobile object 1. Fourth scanner 534 is placed on rear inclined area 34A. Fourth scanner 534 is composed of, for example, the two-dimensional LiDAR, scans a two-dimensional scan range inclined with respect to a horizontal plane above and behind mobile object 1, and outputs a scan result. Specifically, fourth scanner 534 scans a two-dimensional scan range (hereinafter referred to as "upper rearward scan range") A5 which is inclined with respect to the horizontal plane in side view as illustrated in FIG. 6 while having an elliptical shape with a missing part in plan view as illustrated in FIG. 7. Fourth scanner 534 may be formed of a scanner that scans above and a scanner that scans behind or may be formed of one scanner. Although the shape of upper rearward scan range A5 in plan view is not circular as described above, in practice, fourth scanner 534 scans a circular range. On an upper surface of fourth scanner 534, cover 345 is placed to prevent fourth scanner 534 from being wet with rain or snow.

Here, odometry 51, GPS 52, first scanner 531, second scanner 532, third scanner 533, and fourth scanner 534 constitute plural types of sensors 58 that detect information with different contents from each other regarding a moving status of mobile object 1. Since first scanner 531, second scanner 532, third scanner 533, and fourth scanner 534 are each different in the scan range, in the present embodiment, the scanners are regarded as the plural types of sensors 58 that detect the information with different contents from each other.

Imager 54 includes front imager 541, left imager 542, right imager 543, and rear imager 544.

Front imager 541 is placed on the inside of main body 3 in front inclined area 31A and below third scanner 533. In front inclined area 31A, second opening 319 for exposing a lens of front imager 541 to outside is formed.

Left imager 542 is placed above lower left scanner 531A at the tip of left protrusion 323. In left protrusion 323, third opening 324 for exposing a lens of left imager 542 to outside is formed.

Right imager 543 is placed above lower right scanner 531B at the tip of right protrusion 331. At the tip of right protrusion 331, fourth opening 332 for exposing a lens of right imager 543 to outside is formed.

Rear imager 544 is placed on the inside of main body 3 in rear inclined area 34A and below fourth scanner 534. In rear inclined area 34A, fifth opening 346 for exposing a lens of rear imager 544 to outside is formed.

Auxiliary light emitter 55 includes left-side-surface light emitter 551, right-side-surface light emitter 552, and rear-surface light emitter 553. Left-side-surface light emitter 551 is placed on an upper edge portion of left surface 32 in main body 3. Right-side-surface light emitter 552 is placed on an upper edge portion of right surface 33 in main body 3. Rear-surface light emitter 553 is placed on a central part of an upper edge portion of rear surface 34 in main body 3. Left-side-surface light emitter 551, right-side-surface light emitter 552, and rear-surface light emitter 553 are formed so as to extend linearly in a horizontal direction.

Storage 56 stores various kinds of information required to move mobile object 1. Examples of the information stored in storage 56 include: map information, moving path information; a program for functioning control apparatus 57; information on emission patterns of linear light emitters 313 and 314 and auxiliary light emitter 55; a pronunciation pattern of speaker 351; information on selection conditions of information in self-position estimator 573 and obstacle detector 574 to be described later. Incidentally, the moving path information includes coordinates for specifying a plurality of points of the moving path, information on an obstacle present around the moving path, environmental information determined by environment determiner 576 (e.g., information on an artifact and/or a natural object present around the moving path, and information on a grating). The moving path information is desirably generated based on a destination and a current position of mobile object 1. The moving path information may be generated based on the map information stored in storage 56, or may be generated based on obtaining the map information stored in a server via a communication device or the like.

Control apparatus 57 performs various kinds of processing by a microcomputer having a processor executing a program stored in storage 56. Control apparatus 57 is electrically connected to bumper sensor 23, left headlight 311, right headlight 312, left linear light emitter 313, right linear light emitter 314, microphone 322, emergency stop button 344, speaker 351, odometry 51, transceiver 50, GPS 52, scanner 53, imager 54, auxiliary light emitter 55, and storage 56. Control apparatus 57 includes autonomous movement controller 571, remote movement controller 572, self-position estimator 573, and obstacle detector 574.

Autonomous movement controller 571 causes mobile object 1 to autonomously move to a destination based on self-positions regularly estimated by self-position estimator 573, the map information and the moving path information stored in storage 56, and the like. Autonomous movement controller 571 stops mobile object 1 when obstacle detector 574 determines that an obstacle is present around mobile object 1. Examples of the obstacle include a step, a telegraph pole, and a pedestrian, but are not limited to these.

Remote movement controller 572 controls mobile object 1 based on an operation of a remote control device by a remote control operator. Remote movement controller 572 transmits an image captured by imager 54 and information on an outside sound of mobile object 1 input to microphone 322 to the remote control device via transceiver 50. When transceiver 50 receives a remote control signal from the remote control device, remote movement controller 572 controls starting, moving, right-left turning, and stopping of mobile object 1 based on the remote control signal.

Autonomous movement controller 571 and remote movement controller 572 cause mobile object 1 to stop when emergency stop button 344 is pressed or bumper sensor 23 senses contact while mobile object 1 is moving. In addition, autonomous movement controller 571 and remote movement controller 572 turn on headlights 311 and 312 while mobile object 1 is moving or turned on.

Self-position estimator 573 and plural types of sensors 58 constitute self-position estimation apparatus 59. Self-position estimator 573 includes environment determiner 576, obtainer 575, selector 577, and estimator 578.

Obtainer 575 regularly obtains information detected by N (where N is a natural number equal to or greater than two) types of sensors 58 while mobile object 1 is moving or turned on.

Environment determiner 576 determines an environment around mobile object 1. Examples of the environment around mobile object 1 determined by environment determiner 576 include whether indoor or outdoor, traffic of people or objects, a first area, a second area, a hole with a size into which mobile object 1 present in the moving path does not fall, and the like, but are not limited to these.

The first area is an area where estimation accuracy of the self-position based on information detected by second to fourth scanners 532 to 534 in estimator 578 is less than a threshold value. The second area is an area where the estimation accuracy of the self-position based on the information detected by second to fourth scanners 532 to 534 is equal to or greater than the threshold value. Note that, an example of the threshold value described above can be 70%, but the value is not limited to this. Examples of the first area include: an area where a proportion of a natural object in a surrounding area of mobile object 1 is greater than a proportion of an artifact; and an area where an object that is not originally present around mobile object 1, such as an automobile, a bicycle and/or a motorcycle parked in a parking lot, stays there for a threshold time or longer, but the first area is not limited to these. Examples of the second area include: a proportion of an artifact in the surrounding area of mobile object 1 is greater than a proportion of a natural object; and an area where an object that is not originally present around mobile object 1, such as a pedestrian, a traveling bicycle, motorcycle, or automobile, does not stay there for the threshold time or longer, but the second area is not limited to these. An example of the threshold time described above can be 5 seconds, but the threshold time is not limited to this. Examples of the artifact include architecture such as a house, a store, and a building, a bridge, a telegraph pole, a sign, and the like. Examples of the natural object include a tree, a mountain, a person, an animal, and the like. An example of the hole with the size into which mobile object 1 does not fall includes a grating.

Environment determiner 576 may determine an environment based on the map information and the self-position previously estimated by estimator 578. Environment determiner 576 may determine an environment based on at least one of a previous traveling history of mobile object 1, the scan result of scanner 53, and the image captured by imager 54. In a case where a device that outputs a signal indicating the presence of an artifact or natural object is installed near a building or road, environment determiner 576 may determine an environment based on this signal.

The following method may be applied as a method for determining, in environment determiner 576, that a presence position of mobile object 1 is in the first area or the second area. For example, the proportion of an artifact in a surrounding range of mobile object 1 (the range visible from mobile object 1) and the proportion of a natural object are calculated based on a presence state of the artifact or the natural object according to the moving path information, or an imaging result of imager 54, and thus whether the presence position of mobile object 1 is in the first area or the second area may be determined based on the calculation result. Moreover, information indicating that a predetermined position on the moving path is in the first area is included in the moving path information, and thus whether the presence position of mobile object 1 is in the first area may be determined, based on the information. Furthermore, the presence time of a pedestrian, bicycle, motorcycle, and/or automobile around mobile object 1 is calculated on the basis of the imaging result of imager 54, and thus whether the presence position of mobile object 1 is in the first area or the second area may be determined, based on the calculation result and the information on the artifact present around the moving path in the moving path information.

Selector 577 selects information detected by one or more but less than N types of sensors 58 from among the information from the N types of sensors 58 obtained by obtainer 575 based on a determination result of environment determiner 576. For example, selector 577 selects one or more but less than five types (four types or less) of information, from among the information detected by odometry 51, GPS 52, second scanner 532, third scanner 533, and fourth scanner 534, that is, five types of information, as information to be used for self-position estimation. Selector 577 selects one or more but less than six types (five types or less) of information, from among the information detected by odometry 51, GPS 52, first scanner 531, second scanner 532, third scanner 533, and fourth scanner 534, that is, six types of information, as information to be used for an obstacle detection. Note that, detailed processing of selector 577 will be described later.

Estimator 578 estimates a self-position of mobile object 1 based on the information selected by selector 577 as the information for self-position estimation (hereinafter may be referred to as "self-position estimation information").

In a case where the information of odometry 51 is selected, estimator 578 estimates a self-position based on a position and posture of mobile object 1 at the starting of movement and the detection result output from odometry 51.

In a case where the information of GPS 52 is selected, estimator 578 estimates a self-position based on the moving path information and the GPS information output from GPS 52.

In a case where the information of second scanner 532 is selected, estimator 578 calculates a distance from mobile object 1 to an object (artifact, natural object) present in forward two-dimensional scan range A3 and a direction in which the object is present with respect to mobile object 1, based on the scan result output from second scanner 532. Estimator 578 estimates a self-position based on the above calculation result and the moving path information.

In a case where the information of third scanner 533 is selected, estimator 578 generates a three-dimensional map corresponding to forward three-dimensional scan range A4 based on the scan result output from third scanner 533. Estimator 578 estimates a self-position based on the generated three-dimensional map and the moving path information.

In a case where the information of fourth scanner 534 is selected, estimator 578 generates a three-dimensional map corresponding to at least a range above fourth scanner 534 in upper rearward scan range A5 based on the scan result output from fourth scanner 534. Estimator 578 estimates a self-position based on the generated three-dimensional map and the moving path information.

Obstacle detector 574 detects an obstacle present around mobile object 1 based on the information selected by selector 577 as information for obstacle detection (hereinafter may be referred to as "obstacle detection information").

In a case where the information of odometry 51 is selected, obstacle detector 574 detects an obstacle based on a position and posture of mobile object 1 at the starting of movement, the detection result output from odometry 51, and the moving path information.

In a case where the information of GPS 52 is selected, obstacle detector 574 detects an obstacle based on the moving path information and the GPS information output from GPS 52.

In a case where the information of first scanner 531 is selected, obstacle detector 574 calculates a distance from mobile object 1 to an object present in lower left two-dimensional scan range A1 or lower right two-dimensional scan range A2 and a direction in which the object is present with respect to mobile object 1, based on the scan result output from first scanner 531. Obstacle detector 574 detects an obstacle which is present laterally near to mobile object 1, based on the above calculation result and the moving path information.

In a case where the information of second scanner 532 is selected, obstacle detector 574, as well as estimator 578, calculates a distance from mobile object 1 to an object present in forward two-dimensional scan range A3 and a direction in which the object is present with respect to mobile object 1. Obstacle detector 574 detects an obstacle based on the above calculation result and the moving path information.

In a case where the information of third scanner 533 is selected, obstacle detector 574, as well as estimator 578, generates a three-dimensional map corresponding to forward three-dimensional scan range A4. Obstacle detector 574 detects an obstacle based on the generated three-dimensional map and the moving path information.

In a case where the information of fourth scanner 534 is selected, obstacle detector 574, using the same processing as estimator 578, generates a three-dimensional map corresponding to upper rearward scan range A5. At this time, obstacle detector 574 generates a three-dimensional map corresponding to at least one of ranges above and below fourth scanner 534. Obstacle detector 574 detects an obstacle based on the generated three-dimensional map and the moving path information.

<Mobile Object Operation>

Figure 9:
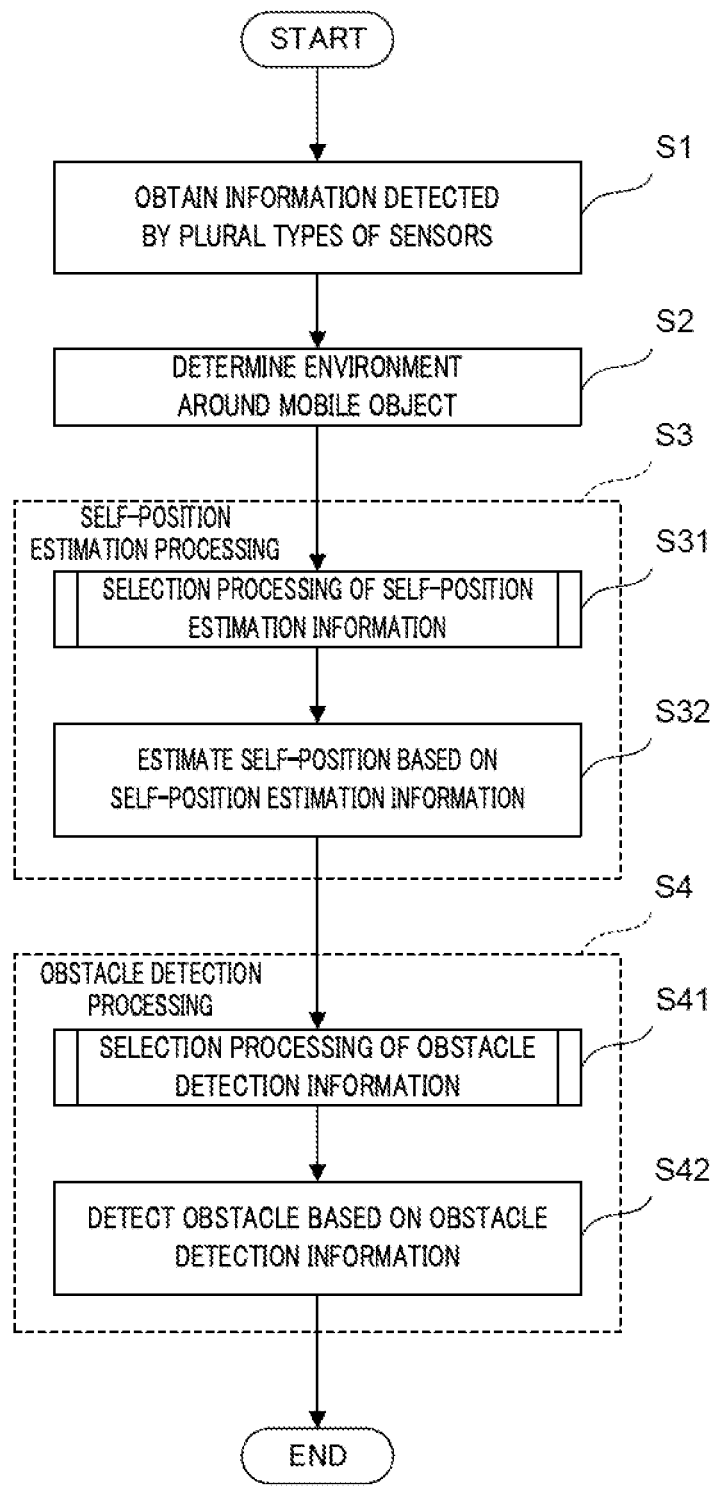
FIG. 9 is a flowchart illustrating an operation of the mobile object according the embodiment of the present disclosure.
Figure 10:
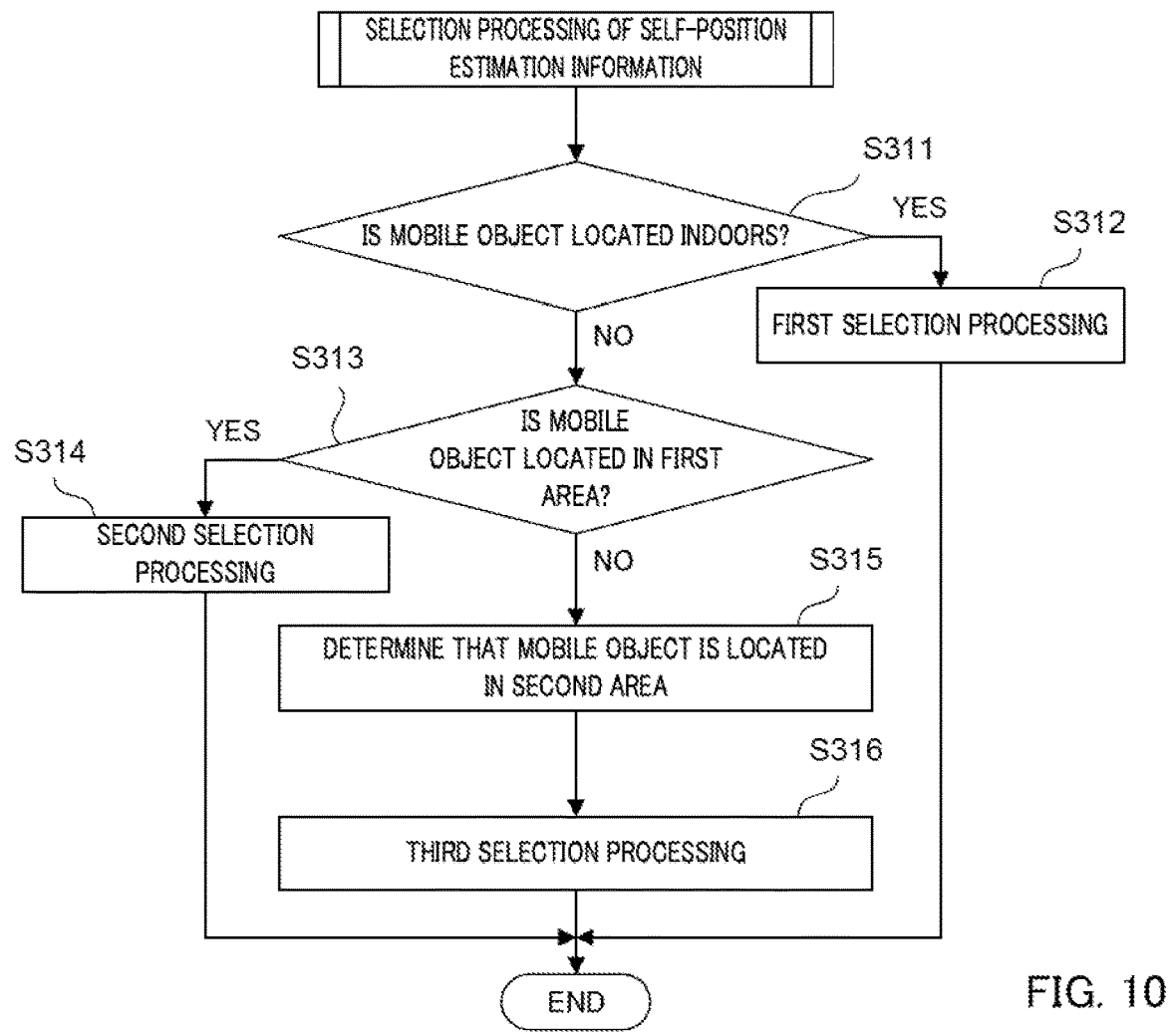
FIG. 10 is a flowchart illustrating selection processing of information for self-position estimation according the embodiment of the present disclosure.
Figure 11:
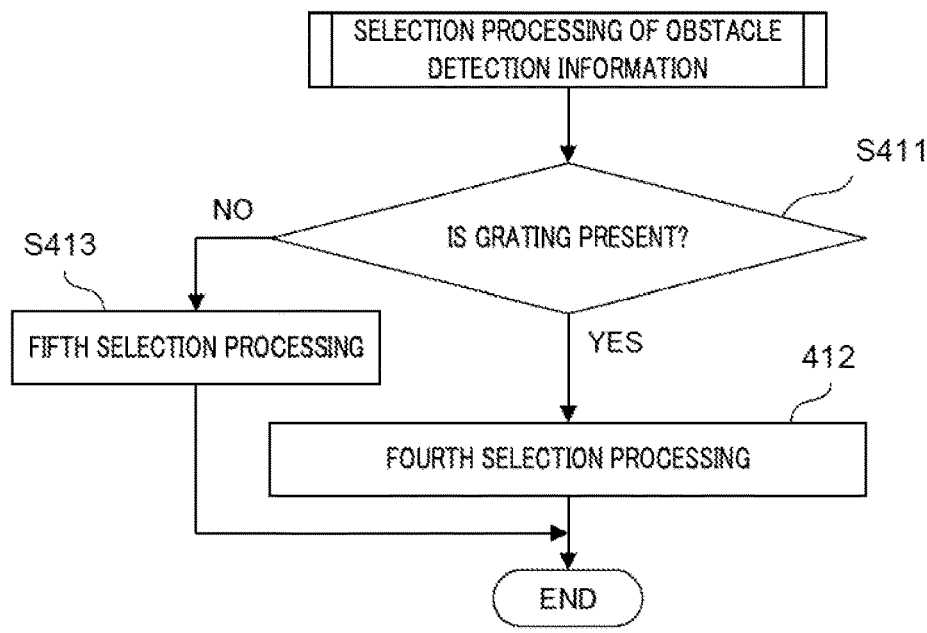
FIG. 11 is a flowchart illustrating selection processing of information for obstacle detection according the embodiment of the present disclosure.

Next, an operation of mobile object 1 will be described. FIG. 9 is a flowchart illustrating an operation of a mobile object. FIG. 10 is a flowchart illustrating selection processing of self-position estimation information. FIG. 11 is a flowchart illustrating selection processing of obstacle detection information.

Control apparatus 57 causes mobile object 1 to move based on the control of autonomous movement controller 571 or remote movement controller 572.

During the control of autonomous movement controller 571 or remote movement controller 572, obtainer 575 of control apparatus 57 obtains information detected by plural types of sensors 58 as illustrated in FIG. 9 (step S1). Specifically, obtainer 575 obtains information detected by odometry 51, GPS 52, first scanner 531, second scanner 532, third scanner 533, and fourth scanner 534.

Next, environment determiner 576 determines an environment around mobile object 1 (step S2) In the present embodiment, environment determiner 576 determines whether mobile object 1 is located indoors or outdoors, mobile object 1 is located in the first area or the second area, and a grating is present.

Next, self-position estimator 573 of control apparatus 57 performs self-position estimation processing (step S3). Obstacle detector 574 of control apparatus 57 performs obstacle detection processing (step S4).

Autonomous movement controller 571 or remote movement controller 572 controls movement of mobile object 1 based on the estimation result of the self-position obtained in the processing in step S3 and the detection result of the obstacle obtained in the processing in step S4. Incidentally, next to the processing in step S2, the processing in step S1 may be performed, and next to the processing in step S4, the processing in step S3 may be performed.

(Self-Position Estimation Processing: Step S3)

Next, a detailed description will be given of the self-position estimation processing in step S3. Selector 577 of self-position estimator 573 performs selection processing of the self-position estimation information (step S31). In the processing in step S31, as illustrated in FIG. 10, selector 577 selects predetermined information as the self-position estimation information from among the information which is obtained in step S1 and has been detected by odometry 51, GPS 52, second scanner 532, third scanner 533, and fourth scanner 534.

Specifically, selector 577 determines whether mobile object 1 is located indoors based on the determination result in step S2 (step S311). When determining that mobile object 1 is located indoors (step S311: YES), selector 577 performs the first selection processing (step S312), and ends the selection processing of the self-position estimation information.

In the present embodiment, in step S312, selector 577 selects the information detected by sensors 58 other than GPS 52 as the self-position estimation information. That is, selector 577 selects the information detected by at least one of odometry 51, second to fourth scanners 532 to 534 as the self-position estimation information. In a case where mobile object 1 is located indoors, GPS 52 possibly cannot detect GPS information. Thus, in some cases, estimator 578 cannot estimate the self-position of mobile object 1 or may estimate, as the self-position, a position different from the actual position, based on the information detected by GPS 52. In contrast, the indoor location of mobile object 1 has little adverse effect on a detection state of the information in odometry 51, and second to fourth scanners 532 to 534. Thus, estimator 578 can appropriately estimate the self-position of mobile object 1 based on the information detected by sensors 58 other than GPS 52.

When determining that mobile object 1 is not located indoors (step S311: NO), selector 577 determines, based on the determination result in step S2, whether mobile object 1 is located in the first area (step S313). When determining that mobile object 1 is located in the first area (step S313: YES), selector 577 performs the second selection processing (step S314) and ends the selection processing of the self-position estimation information.

In the present embodiment, in step S314, selector 577 selects the information detected by sensors 58 other than second to fourth scanners 532 to 534 as the self-position estimation information. That is, selector 577 selects the information detected by at least one of odometry 51 and GPS 52 as the self-position estimation information.

In a case where, for example, the first area is an area where the proportion occupied by a natural object is large, the natural object such as a tree may sway in wind or the like and the shape thereof may not be stable. Thus, second to fourth scanners 532 to 534 possibly cannot appropriately detect a distance to the natural object. Moreover, for example, in a case where the first area is an area where an object that is not originally present around mobile object 1 stays there for a threshold time or longer (there is a parking lot where the automobile is parked), second to fourth scanners 532 to 534 possibly detect a distance to an object that is not originally present in the location. As a result, in a case where mobile object 1 is located in the first area, estimator 578 possibly cannot estimate the self-position of mobile object 1 or may estimate, as the self-position, a position different from the actual position, based on the information detected by second to fourth scanners 532 to 534.

In contrast, the presence of many natural objects around mobile object 1 and/or the presence of an object that is not originally present around mobile object 1 for the threshold time or longer has little adverse effect on detection states of the information in odometry 51 and GPS 52. Thus, even in a case where mobile object 1 is located in the first area, estimator 578 can appropriately estimate the self-position of mobile object 1 based on the information detected by sensors 58 other than second to fourth scanners 532 to 534.

When determining that mobile object 1 is not located in the first area (step S313: NO), selector 577 determines that mobile object 1 is located in the second area (step S315). Next, selector 577 performs the third selection processing (step S316) and ends the selection processing of the self-position estimation information.

In the present embodiment, in step S316, selector 577 selects the information detected by sensors 58 other than GPS 52 as the self-position estimation information. That is, selector 577 selects the information detected by at least one of odometry 51, and second to fourth scanners 532 to 534 as the self-position estimation information.

In a case where, for example, the second area is an area where the proportion occupied by an artifact is large, such as between high-rise buildings, in a tunnel, under an elevated railway, or in an underground parking lot, GPS 52 possibly cannot detect GPS information. Thus, in some cases, estimator 578 cannot estimate the self-position of mobile object 1 or may estimate, as the self-position, a position different from the actual position, based on the information detected by GPS 52.

In contrast, the presence of many artifacts around mobile object 1 has little adverse effect on detection states of the information in odometry 51 and second to fourth scanners 532 to 534. In addition, for example, in a case where the second area is an area where an object that is not originally present around mobile object 1 does not stay there for a threshold time or longer (a pedestrian, traveling bicycle, motorcycle, or automobile are present), second to fourth scanners 532 to 534 are unlikely to detect a distance to an object that is not originally present at the location many times. Thus, estimator 578 can appropriately estimate the self-position of mobile object 1 based on the information detected in sensors 58 other than GPS 52. Moreover, since an artifact is stable in shape, second to fourth scanners 532 to 534 can appropriately detect the distance to the artifact. Consequently, estimator 578 can more appropriately estimate the self-position of mobile object 1 based on the information detected by second to fourth scanners 532 to 534.

As illustrated in FIG. 9, when the selection processing of the self-position estimation information in step S31 is ended, estimator 578 estimates the self-position of mobile object 1 based on the self-position estimation information selected in step S31 (step S32). In the processing in step S32, in a case where a plurality of kinds of self-position estimation information is selected, estimator 578 may estimate the respective self-positions separately using all the kinds of self-position estimation information and estimate, as the self-position, the mean position of estimation results or the most frequently estimated position. Moreover, estimator 578 may select, from among a plurality of kinds of self-position estimation information, one kind of self-position estimation information on the basis of a preliminary set priority or a priority that is set according to the environment around mobile object 1, and may estimate a self-position based on the selected self-position estimation information. Incidentally, the processing of selecting one kind of self-position estimation information from among a plurality of kinds of self-position estimation information based on the priority may be performed in selector 577.

(Obstacle Detection Processing: Step S4)

Next, a detailed description will be given of obstacle detection processing in step S4. Obstacle detector 574 performs selection processing of obstacle detection information based on the processing result of selector 577 (step S41). In the processing of step S41, selector 577 first determines, based on the determination result in step S2, whether a grating is present around mobile object 1 (step S411) as illustrated in FIG. 11. When determining that the grating is present (step S411: YES), selector 577 performs the fourth selection processing (step S412) and ends the selection processing of obstacle detection information.

In the present embodiment, in step S412, selector 577 selects the information detected by sensors 58 other than first scanner 531 as the obstacle detection information. That is, selector 577 selects the information detected by at least one of odometry 51, GPS 52, and second to fourth scanners 532 to 534 as the obstacle detection information. In a case where a grating is present, scanning light emitted from first scanner 531 towards a moving path may enter the grating, and thus a distance to a road surface of the moving path may not be appropriately detected. In this case, obstacle detector 574 erroneously detects a step that is not actually present at a position where the grating is installed, and thus, mobile object 1 may be stopped by the control of autonomous movement controller 571. In contrast, the presence of the grating has little adverse effect on detection states of the information in odometry 51, GPS 52, and second to fourth scanners 532 to 534. Thus, obstacle detector 574 can appropriately detect an obstacle based on the information detected by sensors 58 other than first scanner 531.

When determining that the grating is not present (step S411: NO), selector 577 performs the fifth selection processing (step S413) and ends the selection processing of the obstacle detection information.

In the present embodiment, in step S413, selector 577 selects the information detected by at least one of all sensors 58 including first scanner 531 as the obstacle detection information. This is because the absence of the grating has little adverse effect described above on a detection state of the information in first scanner 531, and all sensors 58 have almost the same detection state.

As illustrated in FIG. 9, when the selection processing of the obstacle detection information in step S41 is ended, obstacle detector 574 detects an obstacle based on the selected obstacle detection information (step S42). In the processing in step S42, in a case where a plurality of kinds of obstacle detection information is selected, obstacle detector 574 may estimate the respective obstacles separately using all the kinds of obstacle detection information. In this case, obstacle detector 574 may estimate, as the distance to the obstacle, the mean value of the distances to the obstacles detected using each of the obstacle detection information. Moreover, obstacle detector 574 may select, from among a plurality of kinds of obstacle detection information, one kind of obstacle detection information on the basis of a preliminary set priority or a priority that is set according to the environment around mobile object 1, and may estimate an obstacle based on the selected obstacle detection information.

In the present embodiment, the selection processing of the obstacle detection information has been performed based on the presence or absence of a grating; however, the selection processing of the obstacle detection information may be performed on the basis of, for example, whether the scan range of at least one of first to fourth scanners 531 to 534 has only an environment where the scanner cannot detect an object (hereinafter may be referred to as an "undetectable environment"). The undetectable environment includes, but is not limited to, an environment where the road surface, a wall, or a ceiling is mostly black, or where lighting such as a fluorescent lamp is too intense. As the selection processing of the obstacle detection information, the following may be selected as the obstacle detection information: the information detected by sensors 58 other than the scanner that the scan range thereof has only the undetectable environment; the information detected by odometry 51 and/or GPS 52 in which the detection accuracy of the information does not depend on the undetectable environment; or the image captured by imager 54. In addition, in a case where the scan range of at least one of first to fourth scanners 531 to 534 has only the undetectable environment, mobile object 1 may be stopped, or the speed of mobile object 1 may be reduced.

Effect of the Embodiment

Self-position estimation apparatus 59 of mobile object 1 determines an environment around mobile object 1 and, based on the determination result of the environment, selects information detected by one or more but less than five types of sensors 58 from among five types of sensors 58 for self-position estimation (odometry 51, GPS 52, and second to fourth scanners 532 to 534). Self-position estimation apparatus 59 estimates a self-position of mobile object 1 based on the selected information. As a result, on the basis of the information of sensors 58 other than sensor 58 that cannot appropriately detect the information, self-position estimation apparatus 59 can appropriately estimate the self-position of mobile object 1 even when sensor 58 that cannot appropriately detect the information in some environments is included in the plurality of types of sensors 58.

Modification of Embodiment

It is needless to say that the present disclosure is not limited to the above-described embodiment, and various modifications may be derived from the above-described embodiment without departing from the spirit thereof.

For example, when determining that mobile object 1 is not located indoors, that is, is located outdoors (step S311: NO), selector 577 may select, as the self-position estimation information, the information detected by at least any one of all sensors 58 including GPS 52 without performing the processing in steps S313 to S316.

In at least one of the following cases of: determining that mobile object 1 is located indoors (step S311: YES); determining that mobile object 1 is located in the first area (step S313: YES); and determining that mobile object 1 is located in the second area (step S315), selector 577 may narrow down the information to be selected as the self-position estimation information based on still another condition. For example, in a case where mobile object 1 is located indoors or in the second area (an area where the proportion occupied by an artifact is large) while there are many people and/or foliage plants around mobile object 1, the moving of the people and/or foliage plants and/or the changing in shape of the foliage plants due to growth, pruning, or the like may cause a situation where second to fourth scanners 532 to 534 cannot appropriately detect a distance to a person or foliage plant. In this case, selector 577 may select, from among odometry 51 and second to fourth scanners 532 to 534, the information detected by odometry 51 as the information for self-position estimation.

Selector 577 may select the information detected by one or more but less than five types of sensors 58 from among five types of sensors 58 based on a criterion different from that illustrated in FIGS. 9 and 10. For example, in a case where there are many people around mobile object 1, second to fourth scanners 532 to 534 possibly cannot detect a distance to a person as described above, selector 577 may select the information detected by at least one of odometry 51 and GPS 52 as the self-position estimation information.

In a case where any of sensors 58 cannot detect information, selector 577 may select the information of the sensors other than the sensor that could not detect the information, and in this case, selector 577 may select the sensor based on the priority set in advance. For example, in the first selection processing, among odometry 51 and second to fourth scanners 532 to 534, when third scanner 533 cannot detect information, the information detected by odometry 51 and the second and fourth scanners 532 and 534 may be selected as the self-position estimation information based on the preliminarily set priority. In addition, in the second selection processing, when GPS 52 cannot detect information even though mobile object 1 is located outdoors, selector 577 may select the information detected by odometry 51 as the self-position estimation information.

Sensors 58 may be configured not to include one or more but less than three types of sensors among the five types of sensors for self-position estimation described above. Moreover, sensors 58 are not limited to the five types of sensors for the self-position estimation described above, and, in addition to or instead of the five types of sensors, may include other types of sensors for detecting the self-position in the manner, for example, described below. Note that, the following sensors used in the method of self-position detection excluding the "pedestrian dead reckoning positioning" correspond to a radio position information detector of the present disclosure.

- WiFi (registered trademark) positioning (three-point positioning of radio from an access point)
- Radio Frequency IDentifier (RFID) Positioning (positioning using RFID tagging)
- Beacon positioning (positioning using Bluetooth (registered trademark))
- Geomagnetic positioning (magnetic force data and magnetic patterns are stored in a database and read by a magnetic sensor)
- Sonic positioning (positioning using speaker+microphone)
- Ultra Wide Band (UWB) Positioning (measured by an incident angle and arrival time difference using radio and sensor)
- Pedestrian dead reckoning positioning (positioning using a gyro sensor, acceleration sensor, and magnetic sensor)

Mobile object 1 may be configured not to include either one of the functions of autonomous traveling and traveling by remote control. Regardless of whether mobile object 1 is equipped with the function of autonomous traveling, the self-position estimated by self-position estimation apparatus 59 may be displayed on the remote control device. The self-position estimation apparatus of the present disclosure may be installed on a mobile object, such as an automobile driven by a person, to cause the estimated self-position to be displayed on a navigation device of the automobile.

INDUSTRIAL APPLICABILITY

The present disclosure can be applied to a self-position estimation apparatus and a mobile object.

REFERENCE SIGNS LIST

1 Mobile object
2 Base body
3 Main body
10 Vehicle body
21 Wheel
22 Bumper
23 Bumper sensor
24 Reflection board
30 Housing
31 Front surface
31A Front inclined area
32 Left surface
33 Right surface
34 Rear surface
34A Rear inclined area
35 Upper surface
50 Transceiver
51 Odometry
52 GPS
53 Scanner
54 Imager
55 Auxiliary light emitter
56 Storage
57 Control apparatus
58 Sensor
59 Self-position estimation apparatus
311 Left headlight
312 Right headlight
313 Left linear light emitter
313A First left division linear light emitter
313B Second left division linear light emitter
313C Third left division linear light emitter
314 Right linear light emitter
314A First right linear light emitter
314B Second right linear light emitter
314C Third right linear light emitter
315 Cover member
316 Front turn signal
317 First opening
318 Eaves part
319 Second opening
321 Storage door
322 Microphone
323 Left protrusion
324 Third opening
331 Right protrusion
332 Fourth opening
341 Number plate
342 Brake lamp
343 Rear turn signal
344 Emergency stop button
345 Cover
346 Fifth opening
351 Speaker
531 First scanner
531A Lower left scanner
531B Lower right scanner
532 Second scanner
532A Front left scanner
532B Front right scanner
533 Third scanner
534 Fourth scanner
541 Font imager
542 Left imager
543 Right imager
544 Rear imager
551 Left-side-surface light emitter
552 Right-side-surface light emitter
553 Rear-surface light emitter
571 Autonomous movement controller
572 Remote movement controller
573 Self-position estimator
574 Obstacle detector
575 Obtainer
576 Environment determiner
577 Selector 578 Estimator
A1 Lower left two-dimensional scan range
A2 Lower right two-dimensional scan range
A3 Forward two-dimensional scan range
A4 Forward three-dimensional scan range
A5 Upper rearward scan range
G Ground

The invention claimed is:

1. A self-position estimation apparatus for estimating a self-position of a mobile object, the self-position estimation apparatus comprising:
N types of sensors (where N is a natural number equal to or greater than two) that detect information with different contents from each other regarding a moving status of the mobile object;
an environment determiner that determines an environment around the mobile object;
a selector that selects information detected by one or more but less than the N types of sensors based on a determination result of the environment determiner; and
an estimator that estimates the self-position of the mobile object based on the information selected by the selector, wherein:
the N types of sensors include a radio position information detector that detects information regarding a position of the mobile object and transmitted via radio, and a scanner that scans around the mobile object,
the environment determiner determines whether the mobile object is located in a first area or a second area, the first area being an area where estimation accuracy of the self-position based on information detected by the scanner is less than a threshold value, the second area being an area where the estimation accuracy of the self-position is equal to or greater than the threshold value, and
the selector selects the information detected by the radio position information detector when the mobile object is located in the first area, and selects the information detected by the scanner when the mobile object is located in the second area.

2. The self-position estimation apparatus according to claim 1, wherein:
the environment determiner determines whether the mobile object is located indoors or outdoors, and
the selector selects information detected by sensors of different types among the sensors between when the mobile object is located indoors and when mobile object is located outdoors.

3. The self-position estimation apparatus according to claim 2, wherein:
the selector selects information detected by the scanner when the mobile object is located indoors, and selects information detected by the radio position information detector when the mobile object is located outdoors.

4. The self-position estimation apparatus according to claim 1, wherein
the second area is an area where a proportion occupied by an artifact is greater than that of the first area.

5. The self-position estimation apparatus according to claim 1, wherein
the environment determiner determines that the mobile object is located in the first area in a case where an object that is not originally present around the mobile object stays for a threshold time or longer, and
the environment determiner determines that the mobile object is located in the second area in a case where an object that is not originally present around the mobile object does not stay for the threshold time or longer.

6. A mobile object, comprising the self-position estimation apparatus according to claim 1.

7. The mobile object according to claim 6, further comprising an obstacle detector that detects an obstacle present around the mobile object based on the information selected by the selector.

8. The mobile object according to claim 7, wherein:
the scanner includes a first scanner that scans a moving path of the mobile object and a second scanner that scans above the moving path of the mobile object,
the environment determiner determines whether a hole with a size into which the mobile object does not fall is present in a scan range of the first scanner, and
the selector selects information detected by the second scanner when the hole is present in the moving path, and selects information detected by at least one of the first scanner and/or the second scanner when the hole is not present in the moving path.

9. The mobile object according to claim 6, further comprising autonomous movement controller that causes the mobile object to autonomously move, based on an estimation result of the self-position in the self-position estimation apparatus.

10. A self-position estimation apparatus for estimating a self-position of a mobile object, the self-position estimation apparatus comprising:
N types of sensors (where N is a natural number equal to or greater than two) that detect information with different contents from each other regarding a moving status of the mobile object;
an environment determiner that determines an environment around the mobile object;
a selector that selects information detected by one or more but less than the N types of sensors based on a determination result of the environment determiner; and
an estimator that estimates the self-position of the mobile object based on the information selected by the selector, wherein
the N types of sensors include a first scanner that scans a moving path of the mobile object and a second scanner that scans above the moving path of the mobile object,
the environment determiner determines whether a hole with a size into which the mobile object does not fall is present in a scan range of the first scanner, and
the selector selects information detected by the second scanner when the hole is present in the moving path, and selects information detected by at least one of the first scanner and/or the second scanner when the hole is not present in the moving path.

11. The self-position estimation apparatus according to claim 10, wherein:
the environment determiner determines whether the mobile object is located indoors or outdoors, and
the selector selects information detected by sensors of different types among the sensors between when the mobile object is located indoors and when mobile object is located outdoors.

12. The self-position estimation apparatus according to claim 11, wherein:
the N types of sensors include a radio position information detector that detects information regarding a position of the mobile object transmitted via radio, and a scanner that scans around the mobile object, and the selector selects information detected by the scanner when the mobile object is located indoors, and selects information detected by the radio position information detector when the mobile object is located outdoors.

13. A mobile object, comprising the self-position estimation apparatus according to claim 10.

14. The mobile object according to claim 13, further comprising an obstacle detector that detects an obstacle present around the mobile object based on the information selected by the selector.

15. The mobile object according to claim 13, further comprising autonomous movement controller that causes the mobile object to autonomously move, based on an estimation result of the self-position in the self-position estimation apparatus.

* * * * *